United States Patent [19]
Schutte et al.

[11] 3,924,029
[45] Dec. 2, 1975

[54] METHOD OF MODIFYING THE SURFACE PROPERTIES OF FINELY DIVIDED METAL OXIDES

[75] Inventors: Dieter Schutte; Jean Diether, both of Rheinfelden, Germany; Helmut Brunner, Princeton, N.J.

[73] Assignee: Deutsche Gold- und Silber-Scheideanstalt vormals Roessler, Frankfurt am Main, Germany

[22] Filed: Mar. 27, 1972

[21] Appl. No.: 238,518

Related U.S. Application Data

[63] Continuation of Ser. No. 840,496, July 9, 1969, abandoned, which is a continuation of Ser. No. 633,307, April 24, 1967, abandoned, which is a continuation of Ser. No. 268,302, March 27, 1963, abandoned.

[30] Foreign Application Priority Data
Mar. 30, 1962 Germany.............................. 38532

[52] U.S. Cl. ......... 427/213; 106/288 Q; 106/308 Q
[51] Int. Cl................................................ B44d 1/02
[58] Field of Search............. 117/100 S, 123 C, 118, 117/161 ZA; 106/288 Q, 308 Q

[56] References Cited
UNITED STATES PATENTS

| | | | |
|---|---|---|---|
| 2,306,222 | 12/1942 | Patnode | 117/100 |
| 2,689,166 | 9/1954 | Rust et al | 117/100 |
| 2,705,206 | 3/1955 | Wagner | 117/100 |
| 2,705,222 | 3/1955 | Wagner | 117/100 |
| 2,739,078 | 3/1956 | Broge | 117/100 |
| 2,938,009 | 5/1960 | Lucas | 117/124 F |
| 2,993,809 | 7/1961 | Bueche et al | 117/100 |
| 3,085,905 | 4/1963 | Prevot et al | 106/308 |
| 3,377,311 | 4/1968 | Roch | 106/308 |

FOREIGN PATENTS OR APPLICATIONS
627,933 9/1961 Canada............................... 117/100

*Primary Examiner*—William D. Martin
*Assistant Examiner*—Dennis C. Konopacki
*Attorney, Agent, or Firm*—Michael S. Striker

[57] ABSTRACT

A process for producing hydrophobic finely divided fume silica which comprises the following steps in the specified sequence:

a. forming, in a first reaction zone, particles of a fume silica having a size of less than approximately 150 millimicrons by thermal decomposition and hydrolysis in the vapor phase of a volatile silicon halide, the said fume silica particles having an acidity corresponding to a pH of approximately 2.0, and including a hydrogen halide and water adsorbed on their surfaces, b. passing the thus-produced fume silica particles out of the said first reaction zone and subjecting them to a deacidification and dehydration pretreatment to reduce their acidity to a value corresponding to a pH of approximately 4.0 by removing substantially all of the adsorbed hydrogen halide and water therefrom, c. passing the thus-pretreated particles of fume silica together with water vapor into a second reaction zone into contact with a stream of hot gases containing substantial proportions of an organohalosilane while the second reaction zone is maintained at a temperature between approximately 400° and approximately 800° C and the particles therein are maintained in a fluidized state and maintained therein for a period sufficient to convert them to hydrophobic fume silica particles, the foregoing step, (c) of the process being performed in the abdence of molecular oxygen, and d. separating and recovering the hydrophobic fume silica particles thus produced from the hot gases and hydrogen halide formed from the organohalosilane while still continuing to exclude molecular oxygen from contact with the particles until the particles have cooled to a temperature below 400° C.

5 Claims, 1 Drawing Figure

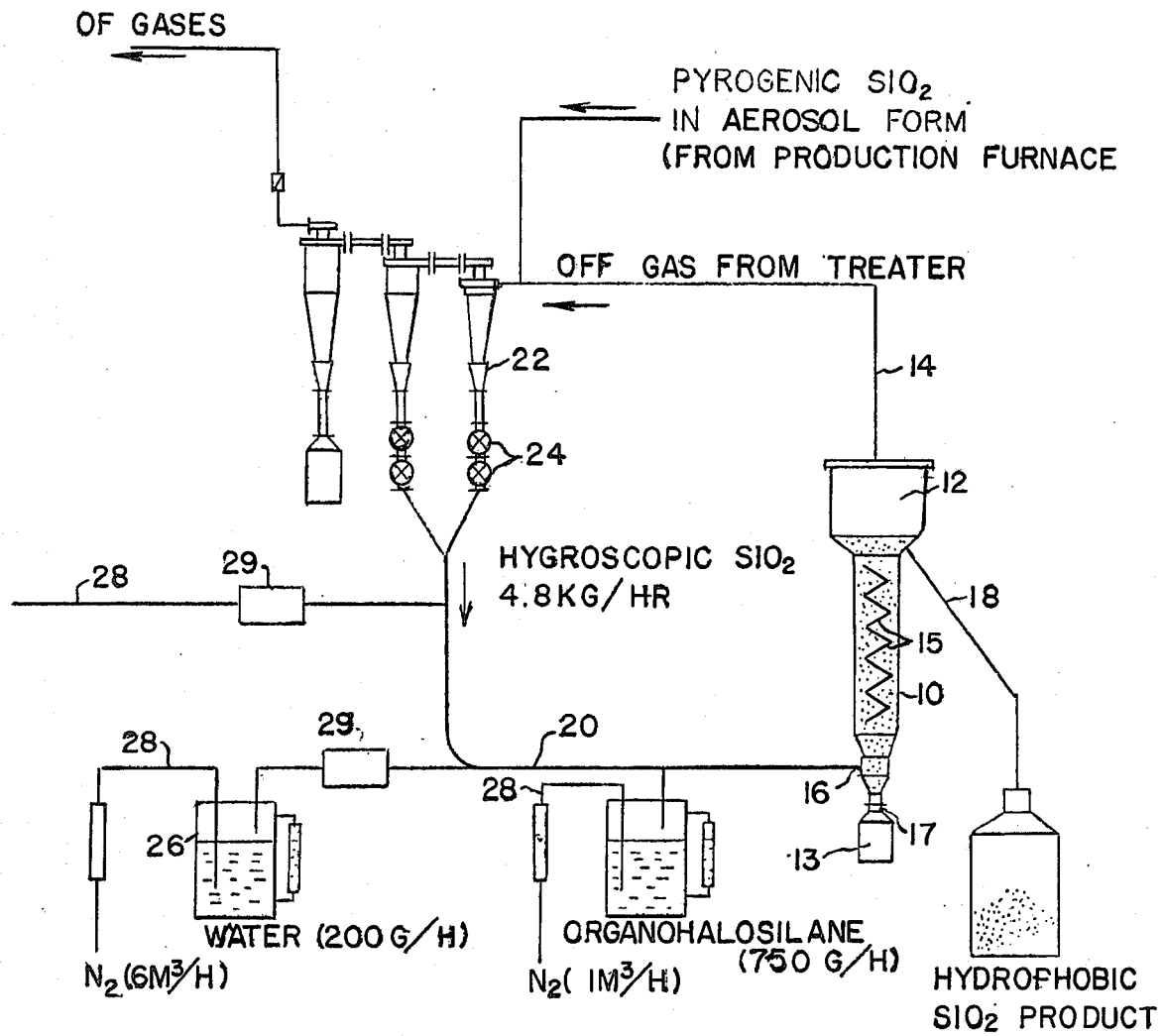

METHOD OF MODIFYING THE SURFACE PROPERTIES OF FINELY DIVIDED METAL OXIDES

This is a continuation of application Ser. No. 840,496 filed on July 9, 1969, now abandoned, which latter application is a continuation of application Ser. No. 633,307 filed on Apr. 24, 1967, now abandoned, and which latter application is a continuation application of application Ser. No. 268,302 filed on Mar. 27, 1963, now abandoned.

This invention concerns a procedure which permits permanently modifying the surface properties of highly dispersed, pyrogenically produced oxides, oxide mixtures and mixed oxides of metals and/or metalloids, by reacting chemically the OH-groups located on the surface of said oxides.

It is known to produce highly dispersed oxides by reaction of metals or metalloids or their volatile compounds in vapor form at higher temperatures in the presence of substances or substance mixtures with hydrolysing and if necessary also oxidizing effect. The preparation, for example, proceeds in that the metals or metalloids to be reacted, or their volatile compounds, in particular their halides, are exposed in gaseous phase to the hydrolysing influence of water vapor or gas mixtures producing it, whereby the oxides produced develop in the form of aerosols and are subsequently isolated at temperatures above the dew point of the easily condensible, gaseous by-products formed in the reaction. For example, the water vapor forming gas mixtures may consist of combustible gases, in particular containing hydrogen or forming it, and of incombustible oxygen-containing gases. Such oxides are normally obtained with an average particle size of less than about 150 m$\mu$. Of the compounds which can be considered as starting materials, the use of volatile halides, especially chlorides or fluorides, is especially advantageous. It is also possible to start out simultaneously with different metals or metalloids or their volatile compounds, and to lead these jointly to the thermal decomposition so that the oxides are separated in the form of mixed oxides. Furthermore, it is possible to combine physically various oxides after each has been obtained separately in order to prepare physical oxide mixtures.

If halogen-containing starting materials are used for the thermal decomposition, for example silicon tetrachloride or silicon tetrafluoride, then one obtains products which, as a result of their high adsorptive capacity, contain large amounts of hydrogen halide, and furthermore halogen bound directly to the metal or metalloid atom. Such oxides have a strong acid reaction. Their contents of hydrohalic acid may for example be 0.1% or more, so that a pH value of about 1.8 results. Such oxides may, for example exhibit hygroscopic properties. Preferably the oxide used as starting product is a pyrogenic silica exhibiting a pH of about 2.0 and containing about 1 millimol of surface hydroxyl groups.

It is already known to make pulverized silicas less hygroscopic by treatment with organic chlorosilanes. In this the chlorosilane reacts with water adsorbed at the surface of the silica, forming hydrochloric acid. The silica made nonhygroscopic in this way must subsequently be freed of the by-product hydrochloric acid formed.

The process of making nonhygroscopic products has furthermore been undertaken with silicone oils on pulverized silica. But, for this purpose, the dry, pulverized silica must be suspended in an organic fluid.

Finally, metal oxides obtained pyrogenically, which exhibit free OH-groups at their surface, have already been treated with gaseous or easily vaporizable substances which can react with these groups by etherification, esterification or acetal formation. Among these are substances such as formaldehyde or ketenes. This treatment has also been undertaken already after a preceding or simultaneous hydrolysis under the influence of water or water vapor. Likewise, largely water-free oxides have been treated with alcohols in the vapor state in a fluid or whirling bed.

There has been no dearth of experiments on permanently modifying the metal or metalloid oxides obtained pyrogenically in their properties by reaction of their OH-groups, located at their surface, for example making them nonhygroscopic. Finely divided oxides, made nonhygroscopic, could, however, be obtained in a stable form only rarely, since no chemical reation with the OH-groups of the surface came about, but only a reaction with superficially adsorbed water. A stable nonhygroscopicity on the other hand can exist only when it has been achieved by a chemical reaction of the actual surface of the solid oxide particles. Only the highly dispersed oxides made nonhygroscopic by chemical reaction cannot be extracted with water for example from carbon tetrachloride. The other products, not reacted chemically with the OH-groups, go into the aqueous phase during this extraction, because the organic molecules, which were merely adsorbed, are detached from their surfaces by the carbon tetrachloride. The same thing applies also to the reaction with other substances which are not agents for making substances nonhygroscopic, and in which, insofar as they react with water, a reaction with the hydroxyl groups is prevented by the presence of adsorbed water or adsorbed hydrogen halide.

It has now been found that highly dispersed oxides, oxide mixtures or mixed oxides of metals and/or metalloids, which have been obtained by thermal decomposition of volatile compounds of these metals or metalloids in the vapor state in the presence of gases or vapors with hydrolysing and/or oxidizing action, can be permanently changed in their surface nature through suitable chemical reaction of the OH-groups located at their surface with suitable substances such as organohalosilanes. In order to effect the necessary chemical reaction, the oxides are kept in a whirling suspension and after first freeing them as far as possible of halogen, hydrogen halide and adsorptively bound water, are mixed as homogeneously as possible with the reactive substance while excluding oxygen. The resulting mixture should be led continuously together with small amounts of water vapor (and if necessary together with an inert gas) to a treatment chamber where the solid substance particles of the whirling suspension are heated to temperatures from about 200° to about 800°C, preferably from about 400° to about 600°C; and most preferably between 400°and 800°C then, the solid and gaseous reaction products are separated from each other, and the solid products are deacidified and dried, if necessary, whereby a contact with oxygen is expediently avoided until after the temperature is below about 200°C.

Most suitable for the procedure according to the invention as already explained are those oxides which have been deacidified as far as possible, that is freed of halogens and hydrogen halides which stem from their production. These deacidified oxides have a pH value of about 4.0 in contrast to the original products. The deacidification can be undertaken by known procedure, such as by treatment at increased temperatures with water vapor in a rotating drum, on an endless steel belt or in helical conveyors. But this deacidification can be carried out especially advantageously in accordance with an older suggestion corresponding to the procedure described in U.S. application Ser. No. 189,236 now abandoned of Bommer et al. which was filed on Apr. 17, 1962, and assigned to the assignee of the present application. This involves treatment in the form of a whirling suspension in a preferably ascending water vapor current, which is diluted if necessary for the regulation of the water vapor partial pressure with an inert gas, at temperatures of about 450° to about 800°C, with continuous removal of the gases which contain the contaminations. By oxides deacidified as far as possible are to be understood within the frame of the procedure according to the invention, those products whose content of adsorbed hydrogen halide is less than about 0.05% by weight, referred to the oxide; preferably this content should amount to about 0.01%.

Furthermore, the oxides to be treated according to the invention must be freed as extensively as possible (practically completely) of molecular water, which means that they should contain less than a monomolecular water layer, that is, for an oxide with a surface of about 200 m²/gm, less than 0.9% molecular water content. This condition is achieved automatically in the execution of a thorough deacidification, in particular when it is carried out according to the procedure of the above-mentioned Bommer et al. U.S. application Ser. No. 189,236. Otherwise, any drying method known as such can be used. It is particularly advantageous to carry out the procedure according to the invention directly following the production procedure for the oxides to be treated, because in this stage the content of adsorbed water is very small. Thus, the treatment according to the invention can, for example be carried out directly following the cyclone separation of the solid oxides from the by-product gases formed therewith.

It is particularly advantageous that the deacidification and the dehydration treatment do not necessarily have to take place in separate zones. The reaction conditions for the surface treatment are such that deacidification and dehydration can take place simultaneously.

The surface treatment with the substance or substances which are suitable for reaction with OH groups, is actually promoted by the presence of small amounts of water vapor, possibly because in this way reactive-OH groups are maintained on the oxide surfaces. It is advisable to put in about 0.5 to 2.0 m-mole of water for each 100 m² of surface of the oxide. Expediently for this, a gas phase containing about 10 to 100 gm water per m³ is used.

The substances used for reaction with the surface OH-groups should be in a dosage which depends on the surface amount of -OH groups available and the treatment purpose; for example, a highly dispersed silica with a surface area of 200 m²/gm exhibits about 1 m-mole/gm of surface OH-groups. Accordingly, 1 m-mole of the reactive substance per gm of such silica should theoretically be put in. For practical operation however, it would be advisable to use 1.5 m-mole/gm in such a case, or 50% more than stoichiometric amounts.

The water vapor used can preferably be diluted with an inert gas, such as nitrogen or the like. In this way a regulation of the water vapor partial pressure in the treatment chamber is possible. Its adjustment can be varied within wide limits, e.g. from about 1 to about 20% of total pressure, and depends only on the requirements in a given case for the preparation of products with definite make-up. In general, it is advisable not to use gases saturated with water vapor.

The reaction products must be separated from the gaseous by-products, such as hydrogen halide, excess treating agent, etc., before the drying. For this, it is important to the successful execution of the procedure that these waste gases be withdrawn continuously, so that they will be sure to be removed from the solid particles before temperatures cool to a level at which marked recontamination takes place, for example by adsorption. Also, if the reaction product has organic constituents, then it is advisable to permit the access of air or oxygen only after the temperature has fallen to less than about 200°C, in order to avoid combustions. Preferably the separation of the treated solid oxide is effected before the temperature has fallen substantially below 400°C.

In the treatment according to the invention, there can be used as inert gas, besides nitrogen, also all gases in which the organic molecule coming into the reaction is not combustible, and which do not enter into any reaction with the -OH groups. In addition these gases must be able to withstand the reaction temperatures without decomposition phenomena. Examples are rare gases, and hydrocarbon and chloro-hydrocarbon gases.

Among the substances which can be used for the surface treatment, belong all compounds which can react in a manner known as such with OH-groups, for example through etherification, esterification or acetal formation. Examples of this are alcohols, aldehydes, ketenes, alkylene oxide and the like. Special advantages are achieved if the oxides are reacted with the corresponding halides of the oxide to be treated. Thus, for example, it is possible to treat silica with silicon tetrachloride according to the procedure of the invention, and one arrives at stable, reticulated agglomerates of the metal oxides which are distinguished by an increased flatting effect. Furthermore, it is especially advantageous to treat the oxides with alkali, expediently with alcoholic alkali. In this way it is, for example, possible to raise the pH value by several units, which is advantageous for certain intended applications of the highly dispersed oxides.

However, treating substances are preferably used which lead to nonhygroscopic products. For this can be used agents known as such for reducing hygroscopicity, in particular alkyl-, aryl- or mixed alkyl-aryl-halosilanes. Examples of such substances, in addition to the preferred dimethyldichlorosilane, are ethyl-trichlorosilane, amyltrichlorosilane, vinyltrichlorosilane, phenyltrichlorosilane methyltrichlorosilane, methyldichlorosilane, methylvinyldichlorosilane, trimethylchlorosilane, diphenyldichlorosilane, bis-trichlorosilyl ethane, bis-trichlorosilylbenzene. A technical mixture of mono-, di-, and trimethyl-chlorosilanes may also be used.

The corresponding esters are, moreover, also suitable, such as ethyltriethoxysilane, amyltriethoxysilane, vinyltriethoxysilane, phenyltriethoxysilane, dimethyl-diethoxysilane, diphenyldiethoxysilane, beta-carbethoxyethyl-triethoxysilane and beta-carbethoxypropylmethyl diethoxysilane. These esters, however, do not belong among the preferred substances, since the reduced hygroscopicity attainable through them is less permanent. Their use is, however, combined with the advantage that no hydrogen halide forms in the corresponding reaction, so that a later deacidification can be omitted in all cases.

In the selection of the treatment agents it is advantageous to use those of high vapor pressure which can be easily converted into the gaseous state.

It is, furthermore, particularly important that the products which can be obtained continue to be capable of thickening organic fluids. Thus, for example, a gel is obtained with a silica made nonhygroscopic according to the procedure of the invention by using about 7% by weight in paraffin oil, carbon tetrachloride and the like. An amount of 6 to 7% by weight of the same silica before treatment is likewise needed. In contrast with this, the products made nonhygroscopic by other procedures exhibit an insufficient thickening ability.

The execution of the procedure can take place either in a counter-current, or more expediently, in a concurrent process. In the execution by the countercurrent process one may, for example, proceed in such a way that the finely divided oxides are introduced at the top in a reaction chamber, which expediently should have a tubular form, and the water vapor, if necessary diluted with an inert gas, is introduced into the chamber from below, and the heating to the required temperature is provided for at the same time. In this case, the oxides move down in a whirling motion counter to the ascending gases. They can then be discharged from the lower part of the furnace with the aid of devices known in the art.

In the preferred execution in a concurrent process, it is expedient to proceed in such a way that the entire treatment is undertaken in a treatment chamber which is so dimensioned that the whirling suspension can move continuously upward and flow out continuously from the upper part of the chamber, preferably after passing through a settling zone. The waste gases are withdrawn continuously in the upper part of the treatment chamber. The hydrogen halides present in these waste gases or any oxide particles that were carried along therewith can be led to a further utilization. A settling zone can be achieved in a simple manner by enlarging the furnace cross section.

The oxides are fed into the treatment chamber, preferably together with the inert gas and/or the water vapor, and find themselves constantly in a whirling motion while in it and until they leave, and, therefore, also in motion relative to the water vapor. However, viewed as a whole the oxide particles are continuously moving towards the upper exit opening of the treatment chamber. In a certain sense therefore this involves a reaction by the whirling-bed or fluid-bed process. In the execution of such procedures it is important that the oxides to be treated have a particle size which can be made to stream upwards. When using highly dispersed oxides, which are obtained in a particle size of less than 15 m$\mu$, it was definitely surprising that such a whirling up and subsequent separation of the solid substance particles from the carrying medium could be executed. This applies in particular to the execution in the concurrent process. It was also not to be anticipated in this that such a successful treatment could be carried out in such short periods of time.

The velocities with which the particles to be treated flow through the treatment chamber, must be at least so great that the upward flow conditions are ful-filled. In the treatment of highly dispersed oxides this is already the case when a flow velocity of the carrying medium of about 2.0 cm/sec. is achieved. The achievement of a given velocity can be done simply by a corresponding dimensioning of the treatment chamber and/or of the amount of vapor or gas introduced.

Within the framework of the present invention it is possible to increase the residence time of the oxides in the treatment chamber by corresponding dimensioning. It is likewise possible to connect several treatment chambers in series with each other.

It is important for the successful treatment of the oxides or the oxide mixtures or mixed oxides, that the whirling solid substance themselves be brought to the above cited temperatures. How long they are kept at these temperatures depends essentially only on the desired constituency of the final products. When using intense-acting heating devices, the treatment is completed already after a few minutes. If on the other hand one uses less effective heating devices, then the period of stay of the particles must be prolonged accordingly. An effective heating of the treatment chamber and with it a successful and rapid treatment of the oxides generally cannot be accomplished by an external heating in a satisfactory manner, as our own experiments have shown, particularly not when it is a matter of carrying out the procedure on a technical scale. Actually, it is not critical within the framework of the present invention in what manner the required temperatures are produced. But the use of an internal heating, preferably with simultaneous supply of hot inert gases, always leads to success and is advantageous with respect to the energy consumed. The internal heating can be done in a known manner such as through infra-red radiators, through high frequency fields or through a flame burning into the treatment chamber. But, because of its good efficiency and resistance to the reaction medium, an internal heating by electrical resistance heaters which are arranged inside an insulating material, for example in quartz tubes, is preferred. The so-called blade heaters which can easily be arranged in large number within the treatment chamber, have worked particularly well in this respect.

It is, furthermore, expedient to use besides the water vapor also another hot inert gas for the treatment according to the invention, namely in such a way that it first supplies at least in part the amount of heat needed for the treatment. The inert gas is expediently supplied to the treatment chamber together with the water vapor. This can be done, for example, by injecting water into a heater with the aid of a dosage pump.

A particularly advantageous variant of the procedure provides for coupling the water vapor and heat production. This can be done, for example, by burning of one or several oxyhydrogen flames. However, these should be reducing flames in order to avoid the presence of molecular oxygen in the reaction zone.

If the procedure according to the invention is carried out using an inert gas too, then it can be used simultaneously for the pneumatic conveying of the oxides to be treated, as well as of the treatment agents, in that they are introduced into the treatment chamber from below and expediently mixed at the same time with the water vapor. This pneumatic conveying is particularly favorable for regulating the residence time in the treatment chamber. It has surprisingly been found that it is possible to work with relatively small amounts of gas, so that a rather low heat input is sufficient.

It is an advantageous factor in the procedure according to the invention, that a complete and permanent reaction, for example making the product nonhygroscopic, can be achieved with a small energy expenditure, and that devices can be used in this which do not exhibit any mechanically movable parts. For this reason it is also possible to use ceramic building materials instead of metallic building materials, thus assuring higher purity of the products.

A device which has proved to be particularly advantageous for the execution of the procedure is illustrated in the drawing which is a flow diagram of the process. It consists essentially of a vertically standing tubular furnace 10, with suitable inlet means 16 for the oxides, the water vapor and the treating agent, an expanding funnel-like enlargement 12 located at its upper end, which serves as settling zone, and outlet means 18 for the treated oxides as well as an exit 14 for the waste gases. Finally, there can also be provided in this device an additional gas heater 17. At the lowest place in the reaction tube can be provided a device 13 for separating the grit.

The inert gas, for example nitrogen, is introduced in controlled amounts through lines 28 and possibly through heaters 29. The needed amount of water vapor can be introduced by using some or all of the nitrogen as a carrier. In the drawing this is shown by passing nitrogen through water reservoir 26. Inert gas and water vapor then arrive through the line 20 leading to inlet 16 to furnace 10. At the same time there is fed into the main line 20 solid oxide coming from the storage containers or from the separators 22, which are located at the end of the production installation for the preparation of the oxides. This solids feeding can be done either through bucket wheal charging valves 24 or through a gravity conveyor. Furthermore, the treating agent in a given case is led to the main line 20 with the aid of an inert gas stream. The complete solids-gas mixture formed rises up in a whirling suspension in the tubular part of the furnace 10. All reactions take place there under the influence of the controlled high temperatures. From the settling zone 12 the treated oxide is discharged through outlet 18. Advantageously, a cyclone (not shown) may still be arranged above the settling zone. The reaction chamber is of course not limited to the cylindrical form. Other forms, for example that of a cone, are also possible. Expediently the reaction chamber should be insulated against heat loss to the surroundings. For internal heating, one mode of execution has worked particularly well, namely the one which is represented in the drawing. These are rod shaped or tubular heating elements 15, which are arranged on the inside of the tubular furnace approximately perpendicular to its long axis. Expediently, these heating elements are so inserted that each is displaced in its long axis by about 60° from each of the next adjacent elements.

From the U.S. Pat. No. 2,993,809 it is known to treat highly dispersed oxides with silanes in the vapor state for the purpose of making them nonhygroscopic. In this previously known procedure, however, the process is such that the agent for making the product nonhygroscopic is added immediately after the flame formation of the oxides from the halides in the presence of water vapor and oxygen at temperatures below 500°C, that is the agent is fed in at the exit of the burner itself. For this reason, it is impractical, if not impossible, to avoid the presence of molecular oxygen. In fact, at the top of column 7 of said patent, it is clearly stated that excess oxygen is desirable in the silicon tetrachloride reaction so that molecular oxygen would obviously be present in large amounts in the process of said disclosure. Moreover, according to this previously known procedure, the products are made nonhygroscopic in the presence of all of the hydrogen halide liberated during the formation of the oxide, so that such hydrogen halide is present in very high concentration. The products obtained will therefore, necessarily have a pH value which is less than 2.0. Furthermore, there is no possibility of independent temperature control in the reaction chamber since it will be automatically determined by the conditions of formation of the oxide. The required water excess in the flame hydrolysis also imposes certain restrictions on particle size of the resulting oxide product. Since the reaction moreover proceeds without control, it is also impossible to regulate the duration of the reaction that makes the products nonhygroscopic and the yield is correspondingly poor. This prior procedure seems unfeasible for use on a commercial scale.

EXAMPLE 1

Into a device, which corresponds to that represented in the drawing, and which has a fluid bed volume of 100 liters, are fed per hour 4.5 kg of finely divided silica with a pH value of 1.8, together with 6 m$^3$/hour nitrogen and 200 gm/hour water vapor with a charging gas. The charging gas consists of nitrogen and is used in an amount of 1 m$^3$/hour. It also is mixed with 720 gm/hour dimethyl dichlorosilane. On the inside of the furnace is maintained a temperature of 400° to 500°C with the aid of an electrical internal heating. The flow velocity of the whirling suspension is 7 to 8 cm/sec. giving a total residence time of 18 to 20 minutes. After leaving the furnace the silica has a pH value of 3.8. Except for the nature of its surface, the product is changed but little compared to the starting material. The BET surface area is 310 m$^2$/gm, the bulk density 30 gm/l and the vibration volume 22.3 gm/liter. the product has only a slight tendency towards agglomeration and exhibits a hydrophobic surface. Similar results were obtained by subjecting a mixed oxide of silica and alumina to the same treatment.

EXAMPLE 2

A silica obtained by flame hydrolysis of SiF$_4$ is deacidified in whirling bed at about 800°C according to the procedure described in U.S. application Ser. No. 189,236 of Bommer et al. which was filed on Apr. 17, 1962, and assigned to the assignee of the present application. In a second whirling bed connected in cascade form behind the deacidification installation, this silica is reacted with dimethyldichlorosilane as described in Example 1. The product has the following properties:

| | |
|---|---|
| Bulk density | 32 gm/liter |
| Vibration Volume | 23.5 gm/liter |
| pH Value | 3.7 |

EXAMPLE 3

A highly dispersed silica with a pH value of 4.0 is treated as described in Example 1 in a flowing bed heated to about 200°C with about 7 m³/hour nitrogen at a flow velocity of 3 to 5 cm/sec. with a 10% alcoholic potassium hydroxide. The potassium hydroxide solution is sprayed into the injector nitrogen with the aid of an atomizing nozzle at 0.8 m³/hour. The product obtained has a pH value of 8.3; its potassium content is 1.03%, its ignition loss 1.03% and its surface area 220 m²/gm. A gel formation of this product in water takes place when an amount of 8.6 gm in 100 ml is used. 15.4 gm are needed with the untreated product. In butanol, for example, an amount of 5.8 gm/100 ml effects a gel formation, while about 19.7 gm are needed for this with the untreated product. In carbon tetrachloride, 5.6 gm of the treated product or 6.3 gm of the untreated product are needed.

EXAMPLE 4

The procedure is as described in Example 1. However, the flowing bed temperature is 600° to 800°C, and 6 to 8 m³ injector nitrogen hourly and 1 kg/hour water, 4 kg/hour highly dispersed silica as well as 400 gm silicon tetrachloride (that is, 10% by weight on the silica) are fed in. The flow velocity is 4 to 8 cm/sec. and the total residence time is 2 to 5 minutes. During this time there occurs both a reticulation and a deacidification of the silica. The product has a pH value of about 4.0 and is distinguished by a particularly stable agglomeration. Similar results were achieved by treating a finely-divided titania with titanium tetrachloride according to the same procedure.

EXAMPLE 5

Into a vertical furnace similar to that represented in the drawing and having a fluid bed volume of 160 liters, are fed 10 kg/hr of finely divided silica together with 8 m³/hr of nitrogen about 550 g/hr of water vapor. The charging gas consisted of about 2 m³/hr of nitrogen carrying about 2 kg/hr of trimethyl chlorosilane. The temperature in the whirling bed through the furnace is maintained at about 400° to 500°C, and the residence time is about 14 to 16 minutes. The recovered silica has a pH of about 3.7 to 3.9, a BET surface area of 200 m²/g and a bulk density of about 25 g/l. It is hydrophobic and only slightly agglomerated.

Similar results to those of the above example are obtained by using a similar procedure on a pyrogenic zirconia of about the same fineness produced by flame hydrolysis of zirconium tetrachloride except that, instead of 2 kg/hr of trimethylchlorosilane, about 1.6 kg/hr of a technical mixture of mono-, di-, and tri-methyl chlorosilanes was employed.

Having described our invention together with preferred embodiments thereof what we claim and desire to secure by U.S. Letters Patent is:

1. A process for producing hydrophobic finely divided fume silica which comprises the following steps in the specified sequence:
   a. forming, in a first reaction zone, particles of a fume silica having a size of less than approximately 150 millimicrons by thermal decomposition and hydrolysis in the vapor phase of a volatile silicon halide, the said fume silica particles having an acidity corresponding to a pH of approximately 2.0, and including a hydrogen halide and water adsorbed on their surfaces,
   b. passing the thus-produced fume silica particles out of the said first reaction zone and subjecting them to a deacidification and dehydration pretreatment to reduce their acidity to a value corresponding to a pH of approximately 4.0 by removing substantially all of the adsorbed hydrogen halide and water therefrom,
   c. passing the thus-pretreated particles of fume silica together with water vapor into a second reaction zone into contact with a stream of hot gases containing substantial proportions of an organohalosilane while the second reaction zone is maintained at a temperature between approximately 400° and approximately 800°C and the particles therein are maintained in a fluidized state and maintained therein for a period sufficient to convert them to hydrophobic fume silica particles,
   the foregoing step (c) of the process being performed in the absence of molecular oxygen, and
   d. separating and recovering the hydrophobic fume silica particles thus produced from the hot gases and hydrogen halide formed from the organohalogenosilane while still continuing to exclude molecular oxygen from contact with the particles until the particles have cooled to a temperature below 400°C.

2. The process of claim 1 in which the organohalosilane is dimethyl dichlorosilane.

3. A process as defined in claim 1 in which the amount of water vapor that is passed into the second reaction zone is between about 10 and about 100 grams per cubic meter.

4. A process as defined in claim 1 in which the organohalosilane is a mixture comprising monomethylchlorosilane, dimethylchlorosilane, and trimethylchlorosilane.

5. A process as defined in claim 1 in which the second reaction zone is a vertical zone, the hot gases containing the organohalosilane are passed upwardly therethrough, the fluidized fume silica particles are also passed therethrough concurrently with the gases and are separated from the gases directly after leaving the said reaction zone while their temperature is still above 400°C.

* * * * *